I. FOX.
WIND SHIELD FOR EYEGLASSES.
APPLICATION FILED AUG. 16, 1911.
1,064,468. Patented June 10, 1913.
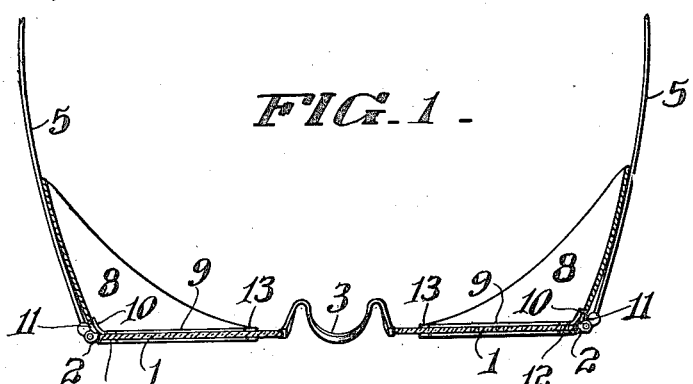
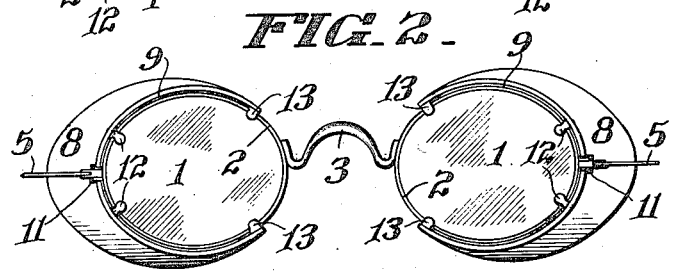
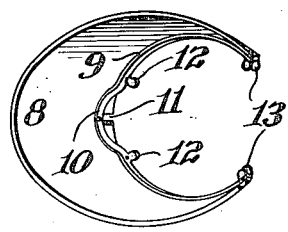
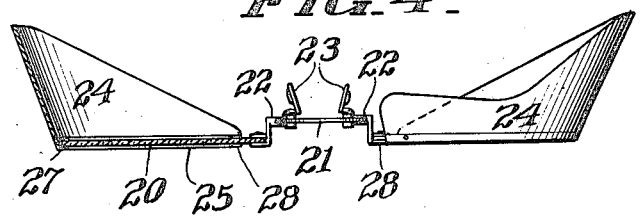
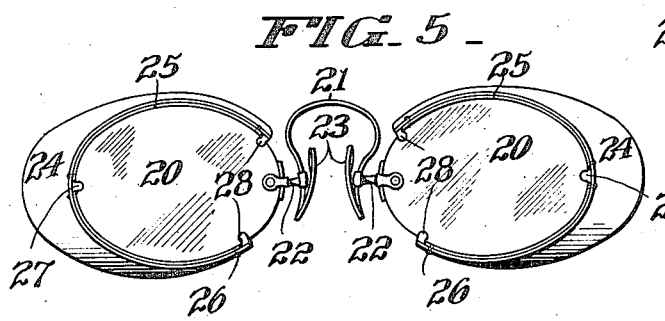
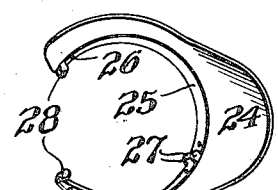
WITNESSES
Carrie E. Kleinfelder
Daniel Webster, Jr.
INVENTOR
Ivan Fox
BY
Cyrus N. Anderson
ATTORNEY

UNITED STATES PATENT OFFICE.

IVAN FOX, OF MEDIA, PENNSYLVANIA.

WIND-SHIELD FOR EYEGLASSES.

1,064,468.

Specification of Letters Patent.

Patented June 10, 1913.

Application filed August 16, 1911. Serial No. 644,378.

*To all whom it may concern:*

Be it known that I, IVAN FOX, a citizen of the United States, residing at Media, in the county of Delaware, State of Pennsylvania, have invented certain new and useful Improvements in Wind-Shields for Eyeglasses, of which the following is a specification.

My invention relates to improvements in wind shields for eye glasses and it has for its object to provide a shield which is adapted to be readily attached to and removed from a pair of eye glasses. The said shield is adapted to be secured to the edges either of the lenses or of the rims which may surround the lenses and when in position upon the face of a wearer projects over the outer corners or sides of the eyes and above and below the same and thereby shields the same from the wind.

My invention is peculiarly adapted for use by those riding in automobiles, or those who by any other means, are moved rapidly or swiftly through the air, for the purpose of preventing the wind from blowing into the eyes and irritating and possibly injuring the same.

A further object of my invention is to simplify and cheapen the construction of shields so that an ordinary pair of eye glasses may be converted into glasses adapted for use by automobilists without very great additional expense.

In order that my invention may be readily understood and comprehended I have illustrated convenient forms of embodiment thereof in the accompanying drawing but it will be understood that changes in the details of construction within the scope of claims may be made without departing therefrom.

In the drawings,—Figure 1 is a horizontal transverse section of a pair of spectacles provided with my invention; Fig. 2 is a front elevation of the same; Fig. 3 is a perspective view, separate from the spectacles, of one of the wind shields embodying my invention and adapted for use upon spectacles; Fig. 4 is a view partly in horizontal section and partly in top plan of a pair of eye glasses provided with my invention; Fig. 5 is a front elevational view of the same; and Fig. 6 is a perspective view of a shield embodying my invention and adapted to be used in connection with eye glasses but being separate from such glasses.

Before taking up the description of my invention in detail I will call attention to the fact, which perhaps is obvious from the drawing, that it is adapted for use not only in connection with spectacles provided with temple wires (which spectacles may be constructed either with or without the frames or bands extending around the lenses) and that it is applicable also to and capable of use with glasses usually referred to as nose glasses in which the glasses are secured upon the nose by means of nose grips.

It should be understood that the principle of my invention is applicable to any and all styles of eye glasses and can readily be adapted to the various designs of frames and mountings which are in use.

Referring to Figs. 1 to 3 of the drawings, 1 designates the lenses of a pair of spectacles secured in rims 2 which rims and lenses are connected together by means of a bridge 3. The temple wires 5 are pivotally secured at the opposite sides of the spectacle in any known manner. The wind shields 8 are secured to the frames and to the lenses of the spectacles, the said shields being located inside of the temple wires 5. The basal edge of the shields are secured to spring wires 9, preferably flat, which are adapted to extend partly around the lenses or around the rims which in turn surround and hold the lenses in position. The springs 9 are of the same general shape and curvature as that of the edges of the lenses or the rims surrounding the same; but the ends thereof, which in use extend beyond the vertical axis of the lenses toward the median line of a pair of glasses, are situated more closely together than the distances across the lenses at the region where the said ends are located and in consequence when the said devices are in position upon a pair of eye glasses the said springs by reason of their spring action clamp and hold against the edges of the lenses or the rim surrounding the same. The outer or crest portions of the springs are respectively curved upwardly, as indicated at 10, for the purpose of carrying the same out of the way of the joints between the temple wires 5 and the rims 2 of the eye glasses at the opposite ends thereof. The shield 8 extends beyond the upwardly extended portion 10 of the spring and is provided with a notch 11 in which a portion of the said joint structure may be located when the shields are placed upon a pair of eye glasses. It will be observed that the springs are secured to the shields 9 upon the inner side thereof adjacent to and practically in alinement with the basal edge thereof. At points situated at or near the opposite ends of the upwardly extended crest portion 10 of the spring, I have provided ears or lugs 12 which are adapted to be seated upon the front or outer surfaces of the lenses at their outer edges or against the rims which may surround the same. At the inner ends of the said springs I have provided oppositely disposed ears or lugs 13 which fit over the rim of the eye glasses or over the edges of the lenses if the rims are not present. The position of the shields and of the means by which they are attached to a pair of spectacles is clearly shown in Figs. 1 and 2 of the drawings, and it is apparent therefrom that when once placed in position the said shields cannot be removed accidentally. In order to remove the shields from the glasses the clips at the opposite ends of the springs 9 are disengaged from the rims or from the edges of the lenses after which the said shields respectively may be turned outwardly or forwardly from the lenses so as to readily disengage the ears or lugs 12 from the glasses so that the shields may then be readily removed.

In Figs. 1 to 3 of the drawing I have illustrated the shields as being substantially symmetrical in shape, the opposite sides thereof being of substantially the same length; but it is to be understood that the shape of the shields may be varied, within limits, at the will of the manufacturer in order to cause the same to fit more accurately the contour of the face of the wearer at the point or points on the face contiguous to the said shields.

Referring to Figs. 4 to 6 inclusive I have shown my invention as applied to a pair of eye glasses which are adapted to be held or secured in position upon the noses of wearers by the gripping action of nose grips in the usual manner. In the said drawings, Figs. 4 to 6, the lenses 20 of a pair of eye glasses are connected together by means of a spring 21 secured at its opposite ends to posts or studs 22 in a known manner. The nose grips 23 are also secured to the said posts or studs 22, the said nose grips being adapted to grip the nose to secure the glasses in position for use. While I have illustrated the lenses as being connected together by means of a spring 21, it will be understood that the lenses may be connected together by means of a bridge, more or less rigid, in which case the nose gripping members may be secured upon pivoted spring actuated arms, as in a well known form of eye glasses, known as or at least frequently designated as finger piece eye glasses. 24 designates the shields which are adapted to be secured to a pair of eye glasses, illustrated in the drawings as being rimless. The said shields are provided with springs 25 which are secured to the basal edges thereof in any suitable manner, as by means of rivets 26. The outer or crest portions of the said springs are provided, respectively, with clips 27 which are adapted to engage the outer edges of the lenses and the inner ends thereof are also provided with clips 28 which are also adapted to engage the edges of the lenses in positions in general opposition to each other. The clips 28, when the shield is in position, are located in positions between the vertical axis of the lenses and the inner edges thereof. In other words the springs 25 are so constructed that their inner ends are normally situated nearer together than the distance between the opposite edges of the lenses along the central transverse vertical axis thereof. It will be seen, therefore, that the said spring cannot be disengaged or removed from the lenses without spreading apart the opposite ends thereof.

As illustrated in Figs. 4 to 6 it will be observed that the upper side of the shield is of somewhat different shape or pattern than the underside thereof. The purpose of constructing the same of different shape is to cause a better and more accurate fit of the upper edge of the shield against the portion of the face at the upper edge of the sockets of the eyes. It will also be observed that the upper sides of the shields project farther inwardly toward the median line of the eye glasses than does the lower side thereof. I prefer not to extend the under or lower sides of shields inwardly to the same extent as the upper sides thereof for the reason that it is preferable to leave spaces between the edges of the under sides of the shields and the portions of the face of a wearer immediately underneath the eyes, and toward the inner corners thereof so that the air may enter somewhat into the spaces between the lenses and the eyes for the purpose of preventing the condensation of moisture upon the rear surface of the lenses (due to perspiration) and thereby maintaining the same in a clear state so that the vision therethrough is unobstructed.

In both of the forms of construction illustrated in the drawings the shield consists preferably of translucent flexible material possessing a greater or less amount of spring action. By constructing the shield of such material the spring action of the springs 9 and 25 is supplemented.

Having thus described my invention, I claim:—

1. A wind shield for eye glasses consisting of a strip of suitable material bent to conform to the shape of the lenses of a pair of eye glasses and a spring member secured to the inner side of the basal edge portion of said member and adapted to extend around the edge of a lens, the said spring member being provided with clips for engaging the edge of the said lens, and the opposite ends of the said spring being situated in contact with the edge of a lens at points between the central vertical axis of a lens and its point of connection to the means for connecting the lenses of a pair of eye glasses together.

2. A wind shield for eye glasses and spectacles consisting of a strip of suitable material so shaped and formed that its rear edges are located in contiguity to the upper, lower, and outer edges of the socket of the eye of the wearer and the front edge of which is connected to a spring of a shape conforming generally to the lenses of a pair of eye glasses and provided with means for securing the said shield to a lens and the opposite ends of the said spring being located toward the median line of a pair of eye glasses from the central vertical axis of a lens and the said ends, when the said shield is not in position upon a lens, occupying positions closer together than the width of the lens between the said ends when the shield is in use.

3. The combination of a pair of eye glasses or spectacles with wind shields having a plurality of clips adapted to engage the said eye glasses or spectacles for securing the said shields in position, the said shields being so shaped and constructed as to fit snugly against the portions of the face above, at the outer corners of, and below the eyes and so as to provide a space between the face and the lower edges of the lenses whereby limited quantities of air are permitted to enter the space between the lenses and the eyes.

4. A wind shield for eye glasses consisting of a strip of suitable material bent to the form of an open loop, a spring similarly bent and secured to the basal edge of the said shield, the length of the said shield and of the said spring being less than the distance around the edges of the lenses of the eye glasses, and the opposite ends of the said shield and spring being separated from each other a distance less than the width of the said lenses and the said spring being provided with lugs which fit over the edges of the eye glass lenses substantially as described.

In testimony that I claim the foregoing as my invention, I have hereunto signed my name this 15th day of August, A. D. 1911.

IVAN FOX.

In presence of—
GEO. H. WEIDNER,
CARRIE E. KLEINFELDER.